Patented July 15, 1941

2,249,277

UNITED STATES PATENT OFFICE 2,249,277

TREATMENT OF CRACKED HYDROCARBON DISTILLATES

William J. Ryan, Wilmington, and Marcus T. Kendall, Long Beach, Calif., assignors to The Texas Company, New York, N. Y., a corporation of Delaware No Drawing. Application September 18, 1940, Serial No. 357,282

4 Claims. (Cl. 196—31)

This invention relates to the chemical treatment of hydrocarbon oils and has to do particularly with the acid treatment and sweetening of cracked hydrocarbon distillates.

In the treatment of cracked hydrocarbon distillates, it is customary to use sulfuric acid of about 66° Bé. gravity, having an acid concentration of about 93% $H_2SO_4$. The acid treated product (after separation of the acid sludge) is neutralized, rerun to separate high boiling point polymerized bodies and then the neutralized product must be treated with doctor solution in order to sweeten same.

The foregoing type of treatment is objectionable in that the acid is relatively non-selective and causes considerable loss of valuable products by excessive removal of desirable constituents along with the undesirable ones. Such an operation also has the disadvantage of producing high boiling sulfur containing compounds which impair the quality of the oil and make it obligatory to use the expensive doctor treatment (sodium plumbite) in order to convert the sour high boiling mercaptans into sweet disulfides.

We have found that the above objections may be overcome and the objects of our invention obtained by using certain treating reagents in the exact strength and operating in a particular manner.

An object of the invention is to selectively remove gum forming constituents without substantially affecting the other constituents of the oil.

A further object of the invention is to treat the oil to produce a product of the desired characteristics and containing substantially no high boiling polymerized products which normally require redistillation to effect separation thereof.

Another object of the invention is to carry out the acid treating operation in such a manner that a product is obtained which may be readily sweetened without resort to the conventional doctor treatment.

Another object of the invention is to provide means of sweetening in combination with the acid treating operation, whereby a finished product is produced much more economically and of improved quality.

In accordance with the invention, a cracked product, such as the cracked distillate from a cracking still, or a mixture of cracked products from several stills, or other sources of supply, is treated with diluted sulfuric acid of the exact strength to selectively remove only the unstable gum forming constituents which may comprise diolefins. The treated oil is then contacted with a strong alkali solution while under considerable superatmospheric pressure and at an elevated temperature. By properly choosing the correct strength of reagents and regulating the conditions of treatment, a stable sweet product may be obtained.

In practicing the invention, sulfuric acid of a concentration not greater than 60% $H_2SO_4$ should be used. We prefer about 57% for treating California distillates. It is intended that the acid be of such strength that only the unstable gum forming constituents are removed. It has been definitely ascertained that sulfuric acid treatment on cracked distillates of over 60% $H_2SO_4$ starts polymerization and even though slight, it increases the gum content and necessitates rerunning to remove this gum of polymerization.

It has been definitely ascertained that sulfuric acid treatment on cracked distillates of less than 55% $H_2SO_4$ fails to remove the substantial portion of the inherent gum (naturally present in the raw gasoline) and thus the gasoline is unfit for commercial use.

On the other hand, it has been definitely ascertained that sulfuric acid of a strength between 55% and 60% $H_2SO_4$ has a particularly selective solvent action on cracked distillates in that it removes substantially all of the inherent gum and at the same time prohibits the formation of synthetic gum because of polymerization being prevented. For example: If the gum formation is due to diolefins, it is desirable to selectively remove these compounds without substantial polymerization of the olefin compounds. It has been found that a gum stable product may be obtained without measurable effect on other properties, such as antiknock, color, etc.

The particular manner of applying the acid may be varied considerably. Good results have been obtained by adding the acid portion-wise. We prefer to use from 2 to 5 dumps of acid, although in some cases it may be satisfactory to use only one dump. A total of about 2 to 12 pounds of acid per barrel of oil is ordinarily sufficient. Any well known or preferred method of contact may be used, such as orifice plates or mechanical mixers, although we prefer a counterflow type of operation. Ordinary temperatures may be used, although it is contemplated that cold acid treatment may be employed if desired.

The acid treated product, after separation of the acid sludge, is neutralized in the customary manner with aqueous caustic alkali or caustic soda. A caustic soda solution of about 5° Bé. gravity is ordinarily used. In some cases this preliminary neutralizing step may be omitted and the acid treated product subjected directly to the hot alkali treatment described hereafter.

The acid treated product above described should be substantially free from high boiling polymerized products and as a result the end point should not be materially altered, whereby redistillation would be required. The product essentially is also free from sulfur compounds which are refractory and difficultly treated. Accordingly, the product so previously treated is peculiarly adapted for the hot alkali treatment in place of the more expensive, customary doctor treatment with sodium plumbite.

The alkali treating or sweetening step is carried out by contacting the oil by any suitable means with a strong alkali solution such as caustic soda. The strength of alkali may be varied and one skilled in the art will be able to determine the required strength to obtain the desired results.

We have found solutions varying from 20 to 50° Bé. gravity satisfactory, and prefer to use about 45° gravity. The temperature of treatment should be at least about 150° F. and may be as high as 300° or more. We prefer temperatures around 200 to 210° F.

The mixture is also maintained under a substantial superatmospheric pressure. This pressure may be that self-generated by confining the vapors of the mixture, and should be at least about 50 lbs. although pressures of 150 or even up to 500 lbs. or more are contemplated. We prefer about 60 to 100 lbs. pressure.

It is essential for the success of the sweetening step of the invention that substantially no polymerization takes place in the acid treating step. Without restricting the invention in any way to a particular theory of reaction, it is believed that when polymerization occurs, high boiling point mercaptans are formed, which will not react with the caustic soda, even under the influence of heat and pressure, and as a result, normally would require the use of plumbite to convert them to disulfides. The present invention provides means for selectively dissolving the inherent gum and substantially preventing polymerization.

The invention is particularly advantageous for treating high sulfur content oils. It is simple and efficient and eliminates the expensive doctor treating operation and substitutes a simple caustic treatment. The reagents, particularly the caustic solution, may be recovered and restored to substantially the original activity by releasing the pressure and steaming.

Instead of first acid treating the oil and then subjecting the acid treated product to the hot alkali treatment, it is sometimes advantageous to give the oil the hot alkali treatment prior to the acid treatment. It is contemplated, therefore, that the untreated oil may be first subjected to treatment with strong alkali substantially as described, the alkali treated product treated with the sulfuric acid and the acid treated product neutralized with dilute caustic solution to produce a finished product. For example, a cracked naphtha was treated at a temperature of around 225 to 325° F. and under a pressure of around 75 to 175 pounds with a caustic soda solution of approximately 25° Bé. gravity, whereby the sulfur compounds were substantially removed. The treated naphtha was then subjected to the above described weak acid treatment. The acid treated product was then neutralized with a weaker caustic soda solution to produce a sweet, gum stable product of low sulfur content.

The sequence of steps in which the caustic treatment precedes the acid treating step is particularly applicable to the treatment of highly cracked naphtha distillates which are characterized by having an aniline point below 100° F., an unsaturated content above 25% by volume and an acid heat test above 60° F. as distinguished from a less refractory type of naphtha having an aniline point materially above 100° F., an unsaturated content substantially below 25% and an acid heat test substantially below 60° F.

As is understood in the industry, the aniline point is the lowest temperature at which equal parts by volume of freshly distilled aniline and the test sample of oil are completely miscible. The acid heat test is determined according to method D481-39 ASTM, while the per cent unsaturated is the proportion of the test sample dissolved in sulfuric acid containing 93.2% $H_2SO_4$ after thorough agitation and upon standing for twelve hours at a temperature in the range of 70-80° F.

Examples of highly cracked naphthas are those obtained by thermal cracking under relatively high temperatures and pressures and also by cracking in the presence of catalysts at relatively high temperatures. Gasoline produced by polymerization processes is also within this category of materials which can be satisfactorily treated by applying the foregoing sequence of steps in which caustic treatment precedes acid treatment. In the case of these highly cracked naphthas the hot caustic treatment apparently causes polymerization of certain hydrocarbon constituents which are present and which are not removed in a weak acid treatment. The hot caustic appears to polymerize these materials into higher boiling gum-forming olefins and aromatics, the removal of which necessitates a final distillation where the hot caustic treatment follows the acid treatment.

However, we have discovered that these particular polymers are soluble in sulfuric acid of about 55-60% concentration and can be extracted from the caustic treated naphtha along with the normal gum-forming bodies in the subsequent acid treating step. In this way the necessity for a subsequent redistillation is obviated.

While we have specified caustic soda solution, it is contemplated that other compounds of the alkali metals or of the alkali earth metals are within the scope of the invention.

The present invention has the advantage over the conventional method of treatment in that the cost of chemicals is materially decreased, treating losses are reduced and the antiknock value of the finished product is increased. It has been found, for example, that treating costs may be reduced 50-75% by our invention; that treating losses may be as much as 60% lower and that the antiknock value of the finished product may be several points higher than normally obtained.

This is a continuation-in-part of our pending application, Serial No. 263,944, filed March 24, 1939, which was a continuation-in-part of application, Serial No. 148,260, filed June 15, 1937.

Obviously many modifications and variations of the invention, as hereinbefore set forth, may be made without departing from the spirit and scope thereof and therefore only such limitations should be imposed as are indicated in the appended claims.

We claim:

1. A process for the treatment of cracked petroleum hydrocarbon distillates which comprises subjecting highly cracked naphtha distillate to the action of aqueous caustic alkali at a temperature of at least about 150° F. while under a substantial superatmospheric pressure to remove sulfur compounds from the oil and then treating the distillate with sulfuric acid of about 55-60% strength to remove gum-forming bodies without substantially affecting other constituents of the oil.

2. A process for the treatment of cracked petroleum hydrocarbon distillates which comprises subjecting a cracked naphtha having an aniline point below 100° F., an unsaturated content above 25% and an acid heat test above 60° F. to the action of aqueous caustic alkali at a temperature of at least about 150° F. while under a substantial superatmospheric pressure to remove sulfur compounds from the oil and then treating the distillate with sulfuric acid of about 55-60% strength to remove gum-forming bodies without substantially affecting other constituents of the oil.

3. A process for the treatment of cracked petroleum hydrocarbon distillates which comprises subjecting a highly cracked naphtha distillate to the action of aqueous caustic alkali at a temperature of around 225 to 325° F. and under a pressure of around 75 to 175 pounds to remove sulfur compounds from the oil and then treating the distillate with sulfuric acid of about 55-60% strength to remove gum-forming bodies without substantially affecting other constituents of the oil.

4. The method according to claim 3 in which the caustic alkali has a concentration of approximately 25° Bé.

WILLIAM J. RYAN.
MARCUS T. KENDALL.